United States Patent

Tsuruma

[11] Patent Number: 6,141,478
[45] Date of Patent: Oct. 31, 2000

[54] ELECTRODE FOR OPTICAL WAVEGUIDE ELEMENT AND METHOD OF FORMING THE SAME

[75] Inventor: Isao Tsuruma, Kanagawa-ken, Japan

[73] Assignee: Fuji Photo Film Co., Ltd., Kanagawa-ken, Japan

[21] Appl. No.: 09/518,227

[22] Filed: Mar. 2, 2000

Related U.S. Application Data

[62] Division of application No. 08/940,975, Sep. 30, 1997, Pat. No. 6,068,781.

[30] Foreign Application Priority Data

Sep. 30, 1996 [JP] Japan .................................. 8-258828

[51] Int. Cl.[7] ......................................... G02B 6/10
[52] U.S. Cl. .......................... 385/132; 385/14; 385/40; 385/129; 385/130; 385/131; 385/141
[58] Field of Search ................................ 385/14, 40, 129, 385/130, 131, 132, 141

[56] References Cited

U.S. PATENT DOCUMENTS

| | | | |
|---|---|---|---|
| 4,003,632 | 1/1977 | Komiya et al. ............... | 385/131 X |
| 4,679,893 | 7/1987 | Ramer .......................... | 385/16 X |
| 4,775,208 | 10/1988 | Robinson et al. ............ | 385/132 X |
| 4,889,401 | 12/1989 | Klement et al. ............. | 385/131 X |
| 4,925,263 | 5/1990 | Sanford et al. .............. | 385/132 X |
| 5,182,228 | 1/1993 | Sekii et al. .................. | 437/129 |
| 5,205,904 | 4/1993 | Yamamoto et al. ......... | 156/664 |
| 5,396,363 | 3/1995 | Valette ........................ | 359/248 |
| 5,479,552 | 12/1995 | Kitamura et al. ........... | 385/132 |
| 5,490,226 | 2/1996 | Nelson ........................ | 385/16 |
| 5,734,772 | 3/1998 | Gopalan et al. ............ | 385/122 |
| 6,068,781 | 5/2000 | Tsuruma ..................... | 216/13 |

FOREIGN PATENT DOCUMENTS 7-146457  6/1995  Japan ........................... G02F 1/035

*Primary Examiner*—Brian Healy
*Attorney, Agent, or Firm*—Sughrue, Mion, Zinn, Macpeak & Seas, PLLC

[57] ABSTRACT

A metal film consisting of a first metal layer of at least one of Ta, Cr, W and Mo, a second metal layer of at least one of Au, Pt and Ag and a third metal layer of at least one of Ta, Cr, W and Mo superposed one on another in this order is formed on a surface of a substrate. Openings of predetermined shapes are formed in the metal film, and proton exchange is carried out on the surface of the substrate with the metal film used as a mask, thereby forming optical channel waveguides. Then the third metal layer is removed from the metal film, and the metal film consisting of the first and second metal layers into electrodes for applying an electric voltage to the optical channel waveguides.

4 Claims, 4 Drawing Sheets

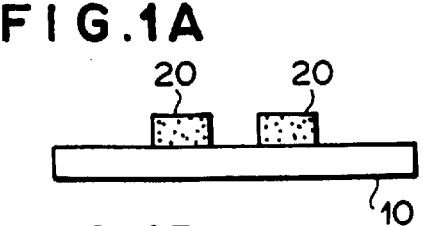
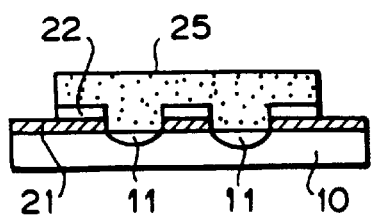
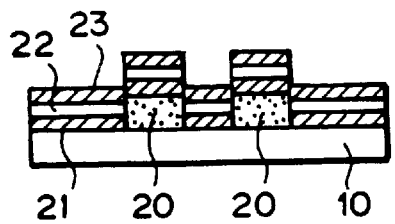
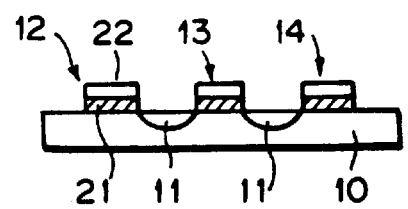
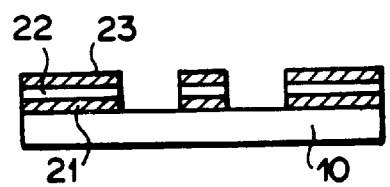
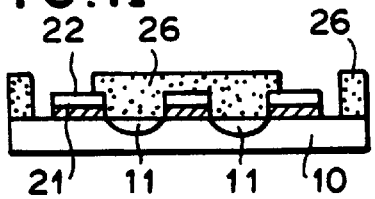
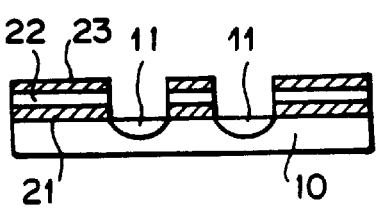
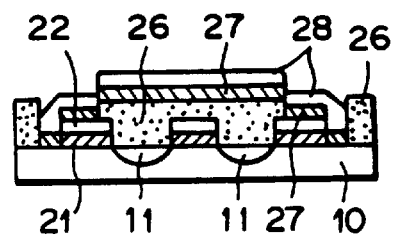
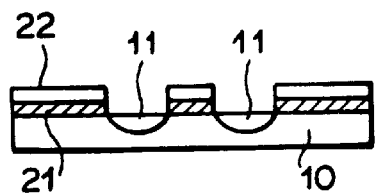
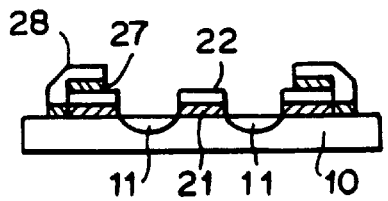
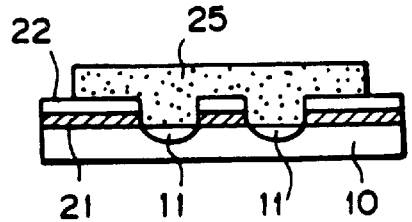

ELECTRODE FOR OPTICAL WAVEGUIDE ELEMENT AND METHOD OF FORMING THE SAME

This is a divisional of application Ser. No. 08/940,975 filed Sept. 30, 1997, the disclosure of which is incorporated herein by reference, now U.S. Pat. No. 6,068,781.

BACKGROUND OF THE INVENTION

1. Field of the Invention

This invention relates to an electrode for applying an electric voltage to an optical channel waveguide of an optical waveguide element in which the optical channel waveguide is formed by proton exchange, and a method of forming the electrode.

2. Description of the Related Art

There have been provided various optical waveguide elements having an optical channel waveguide formed on a substrate. As a method of forming the optical channel waveguide, there has been known a proton exchange process.

In the proton exchange process, metal film is first formed on a surface of a substrate, an opening is formed in the metal film by etching and proton exchange is carried out on the surface of the substrate using the metal film as a mask.

Generally an electric voltage is applied to the optical channel waveguide through electrodes disposed near or just above the optical channel waveguide.

A conventional method of forming the electrodes for applying an electric voltage to the optical channel waveguide will be described with reference to FIGS. 3A to 3H, hereinbelow.

Metal film 2 such as of Cr is first formed on a substrate 1 as shown in FIG. 3A.

A resist layer 3 is formed on the metal film 2 in a predetermined pattern by photolithography as shown in FIG. 3B.

Then the metal film 2 is etched to form openings 4 in a predetermined pattern in the metal film 2 using the resist layer 3 as a mask, and the resist layer 3 is removed as shown in FIG. 3C.

Thereafter proton exchange is carried out using the metal film 2 with the openings 4 as a mask, thereby forming optical channel waveguides 5 on the surface of the substrate 1 as show in FIG. 3D.

The metal film 2 is then removed by etching as shown in FIG. 3E and the substrate 1 is annealed as required.

Thereafter a conductive film 7 such as of aluminum is formed over the surface of the substrate 1 as shown in FIG. 3F.

A resist layer 8 is formed over the conductive film 7 with portions opposed to the optical channel waveguides 5 exposed by photolithography as shown in FIG. 3G.

Then the conductive film 7 is removed at the portions opposed to the optical channel waveguides 5 by etching using the resist 8 as a mask as shown in FIG. 3H.

When the resist 8 is thereafter removed, the conductive films 7 are left on opposite sides of each optical channel waveguide 5. The conductive films 7 on opposite sides of each optical channel waveguide 5 can be used as electrodes for applying an electric voltage to the optical channel waveguide 5.

However this method is disadvantageous in the following point. That is, when the resist mask 8 is formed over the conductive film 7 with the portions opposed to the optical channel waveguides 5 exposed, the edge of the resist mask 8 circumscribing the optical channel waveguide 5 cannot be precisely aligned with the edge of the optical channel waveguide 5 due to fluctuation in skill of the operator and/or in precision of the exposure device. Accordingly, the edges of the electrodes (conductive film) hang over the optical channel waveguide or are positioned away from the edge of the optical channel waveguide 5 as shown in FIG. 4 in an enlarged scale, which results in fluctuation in performance of the optical waveguide element or deterioration in yield. In FIG. 4, L denotes the alignment error.

In Japanese Unexamined Patent Publication No. 7(1995)-146457, there is disclosed a method of forming the electrodes for a optical waveguide element which can overcome such a problem. In the method, the metal film which is used as a mask for setting the pattern of the optical waveguide upon proton exchange is left there and used as the electrodes. That is, metal film is formed on a surface of a substrate, openings of predetermined shapes are formed in the metal film, proton exchange is carried out on the surface of the substrate with the metal film used as a mask, thereby forming optical channel waveguides, and the metal film is removed with at least a part of the edges of the openings left there. The metal film fractions are used as the electrodes.

In the method, the metal film is generally of Ta or Cr suitable for proton exchange. However such metals are high in specific resistance and accordingly optical waveguide elements provided with such electrodes are hard to operate at high speed.

When the aforesaid metal film is formed of Au which is low in specific resistance in order to overcome such a problem, then the following problem arises.

When the Au film is processed to form therein openings of predetermined shapes, wet etching is generally employed since Au is hard to process by dry etching. When the Au film is processed by wet etching, the edges of the openings formed become large in roughness and the dimensional accuracy of the optical waveguide deteriorates, which results in fluctuation in performance of the optical waveguide element or deterioration in yield.

On the other hand, when the Au film is processed by liftoff in order to smoothen the edges of the openings formed, the dimensional accuracy the optical waveguide can be higher than when the Au film is processed by wet etching. However since Au particles are apt to adhere to each other, Au particles released into the solution during liftoff adhere to the Au film fractions which are left there as the electrodes, which can cause short circuit or the like. Further in this case, dust is apt to adhere to the surface of the Au film fractions during proton exchange and/or the subsequent processes and bonding of pad electrodes to the Au film fractions deteriorates. The similar problems arises when precious metal such as Pt is employed in place of Au.

SUMMARY OF THE INVENTION

In view of the foregoing observations and description, the primary object of the present invention is to provide a method of forming electrodes for an optical waveguide element which can form the electrodes with their edges precisely aligned with the edges of the optical channel waveguide without fear of causing short circuit or deterioration in bonding.

Another object of the present invention is to provide an electrode for an optical waveguide element which is formed with its one edge precisely aligned with one edge of the optical channel waveguide and is free from fear of causing short circuit or deterioration in bonding.

In the method of the present invention, the metal film which is used as a mask for setting the pattern of the optical waveguide upon proton exchange is left there and used as the electrodes as in the above identified Japanese patent publication (Japanese Unexamined Patent Publication No. 7(1995)-146457). However in the method of the present invention, the metal film is formed of a plurality of layers of metal such as Ta, Cr or the like suitable for proton exchange and metal such as Au, Pt or the like low in specific resistance.

That is, in accordance with one aspect of the present invention, there is provided a method of forming electrodes for an optical waveguide element comprising the steps of forming on a surface of a substrate a metal film consisting of a first metal layer of at least one of Ta, Cr, W and Mo, a second metal layer of at least one of Au, Pt and Ag and a third metal layer of at least one of Ta, Cr, W and Mo superposed one on another in this order, forming openings of predetermined shapes in the metal film, carrying out proton exchange on the surface of the substrate with the metal film used as a mask, thereby forming optical channel waveguides, removing the third metal layer from the metal film, and processing the metal film consisting of the first and second metal layers into electrodes of predetermined shapes, each electrode including at least a part the edge portion defining the openings.

The third metal layer may be removed after the metal film is processed into the electrodes.

In accordance with another aspect of the present invention, there is provided an electrode for an optical waveguide element which is formed on a substrate, on which an optical channel waveguide is formed by proton exchange, with its one edge aligned with one edge of the optical channel waveguide and is for applying an electric voltage to the optical channel waveguide, wherein the improvement comprises that the electrode comprises a first metal layer of at least one of Ta, Cr, W and Mo and a second metal layer of at least one of Au, Pt and Ag formed on the substrate in this order.

The metal film used as a mask for setting the pattern of the optical channel waveguide upon proton exchange naturally has an edge aligned with an edge of the optical channel waveguide. Accordingly by making an electrode of the metal film, the edge of the electrode can be precisely aligned with the edge of the optical channel waveguide. Thus in accordance with the method of the present invention, optical waveguide elements which are high in accuracy of the position of the electrodes and free from fluctuation in performance can be stably manufactured.

Further since electrodes can be formed with high alignment accuracy without necessity of forming a photomask with high positioning accuracy, yield and working efficiency can be improved without using a high performance apparatus, which results in reduction of the manufacturing cost.

Further in accordance with the method of the present invention, since the second metal layer formed of metal such as Au low in specific resistance is kept covered with the third metal layer formed of at least one of Ta, Cr, W and Mo until the optical channel waveguide is formed, the aforesaid problem of short circuit due to adhesion of particles of Au or the like to the electrode surface and/or deterioration in bonding due to stain of the electrode surface can be avoided.

Moreover, since in the electrodes formed in accordance with the method of the present invention, the second metal layer of Au or the like which is low in resistance is exposed and an electric voltage is applied to the optical channel waveguide through the second metal layer, the optical waveguide element can be operated at high speed.

Further since metal such as Ta or Cr is better bonded to a substrate which is generally used for forming an optical waveguide element than metal such as Au or Pt low in specific resistance, the electrodes are more firmly bonded to the substrate by first forming a first metal layer of Ta, Cr or the like and then forming a second metal layer of Au, Pt or the like on the first metal layer.

BRIEF DESCRIPTION OF THE DRAWINGS

FIGS. 1A to 1K are views for illustrating the procedure of forming the electrodes of an optical waveguide element by a method in accordance with a first embodiment of the present invention.

Figure 2A:
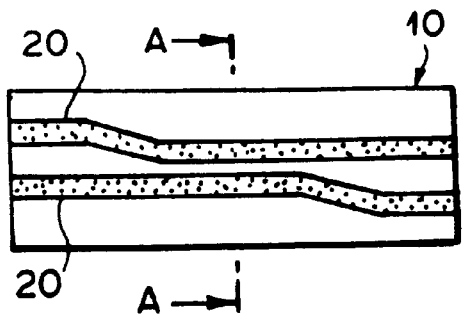
FIGS. 2A to 2E are plan views corresponding respectively to FIGS. 1C, 1F, 1I and 1K, FIGS. 3A to 3H are views for illustrating the procedure of forming the electrodes of an optical waveguide element by a conventional method.

DESCRIPTION OF THE PREFERRED
EMBODIMENTS

A finished optical waveguide element will be first described with reference to FIG. 2E for the purpose of simplicity of understanding. As shown in FIG. 2E, the finished optical waveguide element comprises a substrate 10 which may comprise an x-plate of, for instance, a $LiNbO_3$ crystal. A pair of optical channel waveguides 11, which form a directional photocoupler, are formed on a surface of the substrate 10 to extend in Y-direction, and three electrodes 12, 13 and 14 are formed on the surface of the substrate 10 on opposite sides of the portions of the optical channel waveguides 11 where they extend in parallel to each other close to each other and between the portions. The electrodes 12 and 14 are connected to a drive circuit (not shown) by way of pad electrodes 15 and the electrode 13 is connected to the drive circuit by way pad electrodes 16. A predetermined electric voltage is applied to each of the optical channel waveguides 11 through the electrodes 12, 13 and 14.

Each of the edges of the electrodes 12, 13 and 14 adjacent to the optical channel waveguides 11 should be precisely aligned with the corresponding edge of the optical channel waveguides 11. Otherwise it becomes difficult to precisely apply the predetermined voltage to each optical channel waveguide 11.

A method in accordance with a first embodiment of the present invention which makes it feasible to form the electrodes 12, 13 and 14 in the desired manner will be described with reference to FIGS. 1A to 1K, hereinbelow. FIGS. 1A to 1K are cross-sectional views taken along line A—A in FIG. 2A.

Figure 2D:
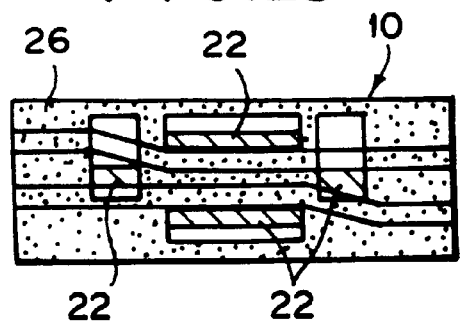

Resist layers 20 are first formed by known lithography on the surface of a substrate 10 in the shape of optical channel waveguides 11 to be formed as shown in FIGS. 1A and 2A.

Then a Ta layer 21, an Au layer 22 and a Ta layer 23 are formed in this order on the surface of the substrate 10 over the resist layers 20 as shown in FIG. 1B. The layers 21, 22 and 23 are, for instance, 15 nm, 100 nm and 15 nm respectively in thickness.

Figure 2B:
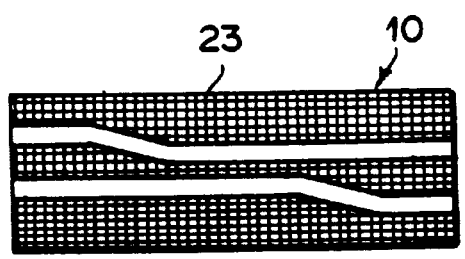
Figure 2E:
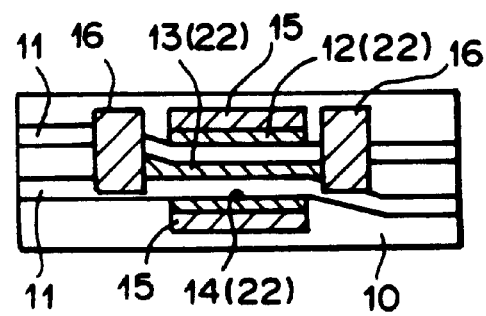

The substrate 10 carrying thereon the resist layers 20 and the metal layers 21, 22 and 23 is then dipped in acetone and subjected to ultrasonic cleaning, and the resist layers 20 and the Ta layer 21, the Au layer 22 and the Ta layer 23 on the resist layers 20 are removed from the substrate 10 by liftoff as shown in FIGS. 1C and 2B.

The substrate 10 is dipped in pyrophosphoric acid heated to 140° C. to 200° C. for a predetermined time, whereby the exposed part of the substrate 10 is subjected to proton exchange and optical channel waveguides 11 are formed on the surface of the substrate 10 as shown in FIG. 1D. Since the fractions of the metal film comprising the Ta layer 21, the Au layer 22 and the Ta layer 23 left on the substrate 10 function as a mask upon proton exchange, the optical channel waveguides 11 formed are in the shape of the resist layers 20.

The resulting substrate 10 carrying thereon the optical channel waveguides 11 and the fractions of the metal layer are cleaned and subjected to heat treatment at 340° C. to 450° C. for a predetermined time. Then the upper Ta layer 23 is removed by etching with fluoronitric acid as shown in FIG. 1E.

Figure 2C:
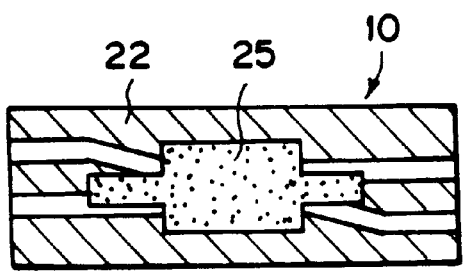
Figure 3A:
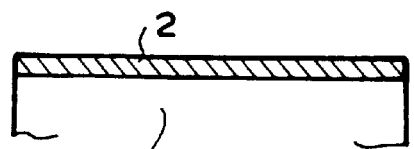
Figure 3B:
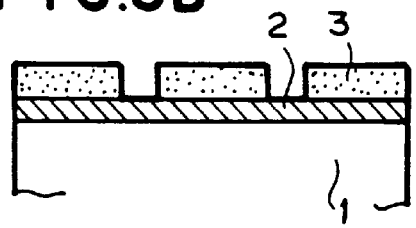
Figure 3C:
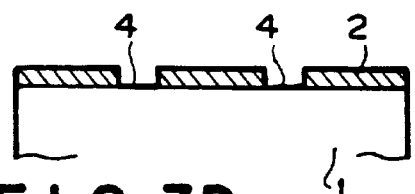
Figure 3D:
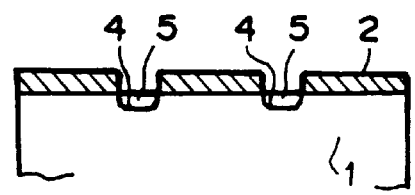
Figure 3E:
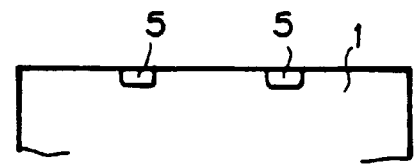
Figure 3F:
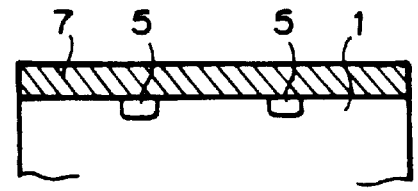
Figure 3G:
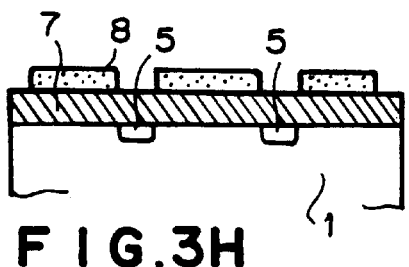
Figure 3H:
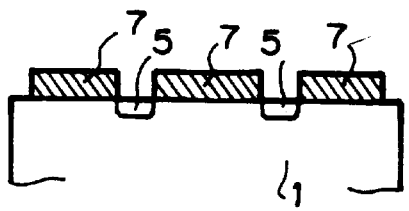
Figure 4:
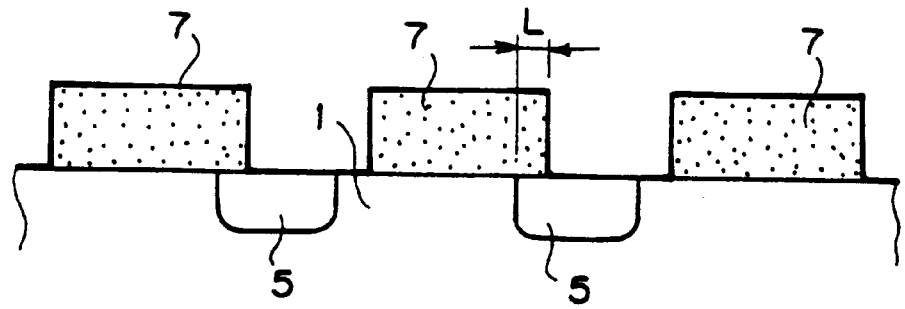
FIG. 4 is a view for illustrating alignment error of the electrodes formed by the conventional method.

In order to process the fractions of the metal film (comprising the Ta layer 21 and the Au layer 22) into the electrodes, a resist layer 25 is formed by lithography as shown in FIGS. 1F and 2C.

Then the part of the Au layer 22 exposed outside the resist layer 25 is removed by etching with aqua regia or iodide etching solution as shown in FIG. 1G.

The resist layer 25 is removed by a plasma asher or resist release solution, and the lower Ta layer 21 is etched with fluoronitric acid with the fractions of the Au layer 22 left on the substrate 10 used as a mask as shown in FIG. 1H. Thus the electrodes 12, 13 and 14 are formed of the fractions of metal film comprising the Ta layer 21 and the Au layer 22.

Then resist layer 26 is formed by lithography in order to form the pad electrodes as shown in FIGS. 1I and 2D.

Then a Cr layer 27 and a Au layer 28 are deposited on the resist layer 26 in this order as shown in FIG. 1J.

Finally the resist layer 26 is removed by liftoff, whereby the pad electrodes 15 and 16 are formed of the Cr layer 27 and the Au layer 28 as shown in FIG. 1K. Thus the optical waveguide element shown in FIG. 2E is finished.

Since the electrodes 12, 13 and 14 are formed by leaving the edges of the Ta layer 21 and the Au layer 22 which define the optical channel waveguides 11, the edges of the electrodes 12, 13 and 14 facing the optical channel waveguides 11 are precisely in alignment with the edges of the optical channel waveguides 11.

Further when the resist layers 20 and the Ta layer 21, the Au layer 22 and the Ta layer 23 on the resist layers 20 are removed from the substrate 10 by liftoff as shown in FIGS. 1C and 2B, the Au layer 22 is covered with the Ta layer 23. Accordingly, the aforesaid problem of short circuit due to adhesion of particles of Au to the electrode surfaces and/or deterioration in bonding due to stain of the electrode surfaces can be avoided.

By forming the openings for defining the shape of the optical channel waveguides 11 by liftoff of the resist layers 20 and the Ta layer 21, the Au layer 22 and the Ta layer 23 on the resist layers 20, the dimensional accuracy of the openings can be higher than by forming the same by etching, which results in a higher dimensional accuracy of the optical channel waveguides 11.

Further since in the electrodes 12, 13 and 14 in the finished state, the Au layer 22 which is low in resistance is exposed and an electric voltage is applied to the optical channel waveguide through the Au layer 22, the optical waveguide element can be operated at high speed.

When the Ta layer 23, which is apt to be stained, is removed after the proton exchange, a clean surface of the Au layer 22 is exposed, whereby the contact resistance between the electrodes and the pad electrodes can be reduced and at the same time, when the Au layer 22 is to be plated, the Au layer 22 can be uniformly plated since the Au layer 22 wets well with plating solution.

Further even when fine dust on the surface of the substrate is removed by a mechanical process, for instance, by brush scrape before the proton exchange, the Ta layer 23, which is relatively hard, cannot be damaged and accordingly the pattern of the optical channel waveguides 11 cannot be adversely affected.

Though the Ta layer 23 is removed after the metal film consisting of the Ta layer 21, the Au layer 22 and the Ta layer 23 is processed into a predetermined shape in the embodiment described above, the Ta layer 23 may be first removed and the metal film consisting of the Ta layer 21 and the Au layer 22 may be processed into a predetermined shape.

Figure 5:
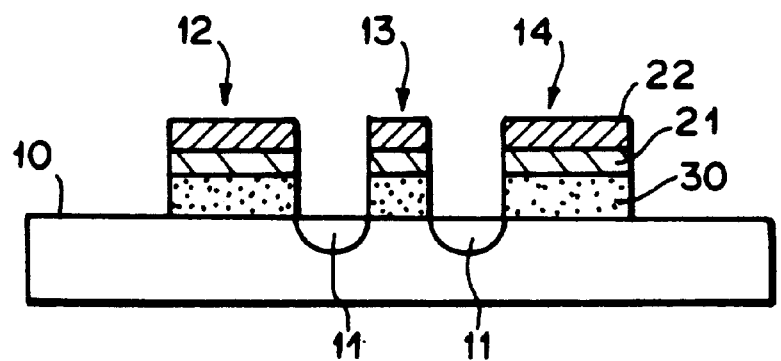
FIG. 5 is a schematic side view of an optical waveguide element provided with electrodes by a method in accordance with a second embodiment of the present invention.

When buffer layers 30 of $SiO_2$ is formed between the substrate 10 and the electrodes 12, 13 and 14 as shown in FIG. 5, light propagation loss due to the electrodes 12, 13 and 14 can be suppressed. The buffer layers 30 can be formed by forming a $SiO_2$ layer, for instance, by sputtering on the substrate 10 between the steps shown in FIG. 1A and 1B.

The unnecessary part of the $SiO_2$ layer can be removed together with the Ta layer 21 in the step shown in FIG. 1H by etching with fluoronitric acid. Accordingly formation of the buffer layers 30 only slightly adds to load on the manufacturing steps.

Figure 6:
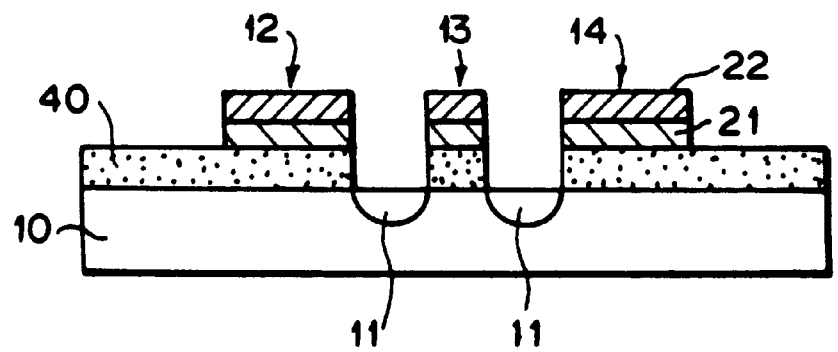
FIG. 6 is a chematic side view of an optical waveguide element provided with electrodes by a method in accordance with a third embodiment of the present invention.

When the buffer layers are formed of a material other than $SiO_2$ such as HfO, the unnecessary part of the buffer layers 40 sometimes cannot be removed together with the Ta layer 21 as shown in FIG. 6. The light propagation loss reduction effect is the same irrespective of whether the buffer layers 40 are of the same shapes as the electrodes 12 and 14. If necessary the unnecessary part of the buffer layers 40 may be removed by etching separately from the Ta layer 21.

What is claimed is:

1. An electrode for an optical waveguide element which is formed on a substrate, on which an optical channel waveguide is formed by proton exchange, with its one edge aligned with one edge of the optical channel waveguide and is for applying an electric voltage to the optical channel waveguide, wherein the improvement comprises that the electrode comprises a first metal layer of at least one of Ta, Cr, W and Mo and a second metal layer of at least one of Au, Pt and Ag formed on the substrate in this order.

2. An electrode for an optical waveguide element as defined in claim 1 in which a buffer layer is formed between the substrate and the first metal layer.

3. An electrode for an optical waveguide element as defined in claim 1 in which said substrate is of a material selected from the group consisting of a $LiNb_xTa_{1-x}O_3$ ($0 \leq x \leq 1$) crystal, a Mg-doped $LiNb_xTa_{1-x}O_3$ ($0 \leq x \leq 1$) crystal and a Zn-doped $LiNb_xTa_{1-x}O_3$ ($0 \leq x \leq 1$) crystal.

4. An electrode for an optical waveguide element as defined in claim 2, in which said substrate is of a material selected from the group consisting of a $LiNb_xTa_{1-x}O_3$ ($0 \leq x \leq 1$) crystal, a Mg-doped $LiNb_xTa1-xO_3$ ($0 \leq x \leq 1$) crystal and a Zn-doped $LiNb_xTa1-xO_3$ ($0 \leq x \leq 1$) crystal.

* * * * *